(12) United States Patent
Utaka et al.

(10) Patent No.: US 8,884,487 B2
(45) Date of Patent: Nov. 11, 2014

(54) STATOR FOR ELECTRIC ROTATING MACHINE

(75) Inventors: Ryosuke Utaka, Takahama (JP); Tomokazu Hisada, Anjo (JP)

(73) Assignee: Denso Corporation, Kariya (JP)

( * ) Notice: Subject to any disclaimer, the term of this patent is extended or adjusted under 35 U.S.C. 154(b) by 658 days.

(21) Appl. No.: 13/106,159

(22) Filed: May 12, 2011

(65) Prior Publication Data

US 2011/0278973 A1 Nov. 17, 2011

(30) Foreign Application Priority Data

May 13, 2010 (JP) ................................. 2010-111443

(51) Int. Cl.
*H02K 3/04* (2006.01)
*H02K 3/28* (2006.01)
*H02K 3/12* (2006.01)

(52) U.S. Cl.
CPC ... *H02K 3/28* (2013.01); *H02K 3/12* (2013.01)
USPC .......................................................... 310/201

(58) Field of Classification Search
USPC .......................................................... 310/201
See application file for complete search history.

(56) References Cited

U.S. PATENT DOCUMENTS

| | | | |
|---|---|---|---|
| 6,181,044 B1 * | 1/2001 | Umeda et al. | 310/201 |
| 6,208,058 B1 | 3/2001 | Taji et al. | |
| 6,498,414 B2 * | 12/2002 | Asao | 310/184 |
| 6,995,492 B1 | 2/2006 | Kouda et al. | |
| 2002/0024266 A1 | 2/2002 | Asao | |
| 2004/0041491 A1 | 3/2004 | Gorohata et al. | |

FOREIGN PATENT DOCUMENTS

| | | |
|---|---|---|
| JP | 2001-37131 | 2/2001 |
| JP | 2002-78269 | 3/2002 |
| JP | 2002-218689 | 8/2002 |
| JP | 2004-032882 | 1/2004 |
| JP | 2004-048941 | 2/2004 |
| JP | 2005-124375 | 5/2005 |

OTHER PUBLICATIONS

Office Action (2 pgs.) dated Nov. 21, 2013 issued in corresponding Japanese Application No. 2010-111443 with an at least partial English-language translation thereof (2 pgs.).

* cited by examiner

*Primary Examiner* — Tran Nguyen
(74) *Attorney, Agent, or Firm* — Nixon & Vanderhye PC

(57) ABSTRACT

A stator for an electric rotating machine is equipped with a stator winding made up of a plurality of conductor segments. Each of the conductor segments has a head and two legs. The legs are inserted through their respective slots formed in a stator core, so that each of the conductor segments has leg ends protruding from either one of opposed end surfaces of the stator core and the head thereof protruding from the other end surface. Radially adjacent two of the leg ends are provided as a coil end pair to be welded. At least one of the heads is interposed between adjacent two of the coil end pairs, thereby ensuring a distance between the two adjacent coil end pairs which is great enough to provide a required degree of electric insulation between the coil end pairs when the leg ends of the conductor segments are welded electrically.

8 Claims, 11 Drawing Sheets

STATOR FOR ELECTRIC ROTATING MACHINE

CROSS REFERENCE TO RELATED DOCUMENT

The present application claims the benefit of priority of Japanese Patent Application No. 2010-111443 filed on May 13, 2010, the disclosure of which is incorporated herein by reference.

BACKGROUND OF THE INVENTION

1. Technical Field

The present invention relates generally to a stator of an electric rotating machine such as an electric motor or an electric generator to be mounted in, for example, automotive vehicles such as electric vehicles or hybrid vehicles and a production method thereof.

2. Background Art

FIG. 1 illustrates a conventional stator 10 for use in electric rotating machines. The stator 10 includes an annular stator core 14 and a stator winding 16. The stator core 14, as illustrated in FIG. 2, has a plurality of slots 12 arrayed at regular intervals in a circumferential direction thereof. The stator winding 16 is wound through the slots 12 of the stator core 14. The stator winding 16 is made up of a plurality of U-shaped conductor segments 16a which are inserted into the slots 12, for example, from the lower side of FIG. 1. Ends 16b of the U-shaped conductor segments 16a extend outside an upper end, as viewed in FIG. 1, of the stator core 14 and are arrayed coaxially. Each of the ends 16b of the conductor segments 16a is bent in either of opposite circumferential directions of the stator core 14, so that every two of the ends 16b which belong to the different conductor segments 16a are arrayed adjacent each other in a radial direction of the stator core 14. Additionally, each of the U-shaped conductor segments 16a is twisted so that every two of the ends 16b of the U-shaped conductor segments 16a which are to be welded are arranged close to each other in the radial direction of the stator core 14 to form a coil end pair 16c. The coil end pairs 16c are, as can be seen from FIG. 3, arranged at regular intervals in the circumferential direction of the stator core 14 in coaxial circular lines and also aligned radially in a plurality of lines. In the illustrated example, the ten (10) coil ends 16b are arrayed above each of the slots 12 of the stator core 14.

The coil ends 16b of each pair 16c are joined into a weld 16d, as illustrated in FIG. 4, by, for example, TIG (Tungsten Inert Gas) welding. Such welding requires an interval d1 between every adjacent two of the coil end pairs 16c (i.e., the welds 16d) along the end surface of the stator core 14 to be great enough to ensure electric insulation therebetween.

The ten (10) coil ends 16b extend, as illustrated in FIG. 5, vertically from each of the slots 12 and are arrayed in line in the radial direction of the stator core 14. The coil ends 16b above each slot 12 will also be referred to as first to tenth coil ends 16b-1 to 16b-10, respectively, which are arrayed from inward to outward of the stator core 14. Such radial in-line arrangement of the coil ends 16b may result in a lack of an interval d1 between every adjacent two of the coil ends 16b required to ensure the electric insulation therebetween, which may result in undesirable electrical discharge when the coil ends 16b are welded.

In order to prolong the interval d1 between every adjacent two of the coil end pairs 16c, Japanese Patent First Publication No. 2004-32882 (corresponding to U.S. Pat. No. 6,833,648 B2, assigned to the same assignee as that of this application) discloses an arrangement of the coil ends 16b-1 to 16b-10, as illustrated in FIG. 6. Specifically, the third to tenth coil ends 16b-3 to 16b-10 are shaped to have base portions 16e slanting outward at gradually increasing angles.

The third to tenth coil ends 16b-3 to 16b-10 are bent radially outward of the stator core 14 to have the slant base portions 16e after which all the first to tenth coil ends 16b-1 to 16b-10 are bent, as illustrated in FIG. 1, in the circumferential direction of the stator core 14. Each of the slant base portions 16e is required to have a height h1 from the end surface of the stator core 14, which will result in an increase in overall height h2 of the coil ends 16b-1 to 16b-10. This leads to an increase in size of the stator 10 undesirably. The increased size of the stator 10 requires increasing the size of a motor housing in which the stator 10 is to be disposed, which will result in deterioration in mountability of the electric rotating machine in automotive vehicles.

Each of the conductor segments 16b is also required to have a length great enough to bent the base portion 16e both in the outward direction and in the circumferential direction of the stator core 14, thus resulting in an increase in material cost of the stator winding 16.

SUMMARY

It is therefore an object to provide an improved structure of a stator of an electric rotating machine designed to ensure a required degree of electrical insulation between coil ends of conductor segments to be welded without needs for increasing the cost of material of a stator winding and entire size of the stator.

According to one aspect of an embodiment, there is provided a stator for an electric rotating machine which comprises: (a) an annular stator core which has a plurality of slots arrayed in a circumferential direction thereof, the stator core having a first end surface and a second end surface opposed to the first end surface in an axial direction thereof; and (b) a stator winding made up of a plurality of conductor segments. Each of the conductor segments is bent to have a head and legs extending from the head. The legs of each of the conductor segments are inserted through the different slots, respectively, so that each of the conductor segments has ends of the legs thereof protruding from either one of the first and second end surfaces of the stator core and the head thereof protruding from the other of the first and second end surfaces of the stator core.

The ends of the legs which protrude from either of the first and second end surfaces are arranged in a plurality of radial arrays extending radially of the stator core. Every two of the ends of the legs which are located adjacent each other in each of the radial arrays are provided as a coil end pair. Adjacent two of the coil end pairs in each of the radial arrays are arranged away from each other across at least one of the heads of the conductor segments. The ends of each of the coil end pairs are welded to form the stator winding.

Specifically, at least one of the heads of the conductor segments in the radial array is interposed between adjacent two of the coil end pairs, thereby ensuring a distance between the adjacent two of the coil end pairs which is great enough to provide a required degree of electric insulation between the coil end pairs when the ends of the conductor segments are welded electrically.

The above layout of the coil end pairs of the conductor segments eliminates the need for the ends of the conductor segments to have the length required to bend base portions thereof outward in the radial direction of the stator core, thus permitting the overall height of the ends of the conductor segments to be decreased. This also permits the stator to be downsized in the axial direction thereof, which improves the mountability of the electric rotating machine in the automotive vehicles.

In the preferred mode of an embodiment, the stator winding includes a coil segment which is made up of the conductor segments each of which has the legs inserted into two of in-slot locations which are away from each other in the circumferential direction of the stator core. Each of the in-slot locations is defined by an intersection of one of radial lines extending along the radial arrays of the ends of the conductor segments with one of a given number of coaxial circular lines extending coaxially with a center of the stator core. The legs passing through the in-slot locations on outer two of the coaxial circular lines are inserted from a first direction opposite a second direction in which the legs passing through inner two of the coaxial circular lines which extend inward of the outer two.

One of the ends of the conductor segments which protrudes from one of the first and second end surfaces of the stator core is connected to one of the ends of the conductor segments which protrudes from the other of the first and second end surfaces through ends of a second conductor segment which is different in shape from said conductor segments.

The ends of the legs of the conductor segments which are arrayed in a same one of the radial arrays as the end of the second conductor segment are bent in the radial direction of the stator core.

According to another aspect of the embodiment, there is provided a method of producing a stator for an electric rotating machine which comprises: (a) preparing an annular stator core which has a plurality of slots arrayed in a circumferential direction thereof, the stator core having a first end surface and a second end surface opposed to the first end surface in an axial direction thereof; (b) preparing a plurality of conductor segments, each of the conductor segments being bent to have a head and legs extending from the head; and (c) inserting the legs of each of the conductor segments through the different slots, respectively, so that each of the conductor segments has ends of the legs thereof protruding from either one of the first and second end surfaces of the stator core and the head thereof protruding from the other of the first and second end surfaces of the stator core.

The ends of the legs of the conductor segments to make a stator winding wound through the slots of the stator core The ends of the legs which protrude from either of the first and second end surfaces are arranged in a plurality of radial arrays extending in a radial direction of the stator core. Every two of the ends of the legs which are located adjacent each other in each of the radial arrays are provided as a coil end pair. Adjacent two of the coil end pairs in each of the radial arrays are arranged away from each other across at least one of the heads of the conductor segments. The ends of each of the coil end pairs are welded to form the stator winding.

In the preferred mode of an embodiment, the stator winding includes a coil segment which is made up of the conductor segments each of which has the legs inserted into two of in-slot locations which are away from each other in the circumferential direction of the stator core. Each of the in-slot locations is defined by an intersection of one of radial lines extending along the radial arrays of the ends of the conductor segments with one of a given number of coaxial circular lines extending coaxially with a center of the stator core. The legs passing through the in-slot locations on outer two of the coaxial circular lines are inserted from a first direction opposite a second direction in which the legs passing through inner two of the coaxial circular lines which extend inward of the outer two.

One of the ends of the conductor segments which protrudes from one of the first and second end surfaces of the stator core is connected to one of the ends of the conductor segments which protrudes from the other of the first and second end surfaces through ends of a second conductor segment which is different in shape from said conductor segments.

The ends of the legs of the conductor segments which are arrayed in a same one of the radial arrays as the end of the second conductor segment are bent in the radial direction of the stator core.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENT

Figure 7:
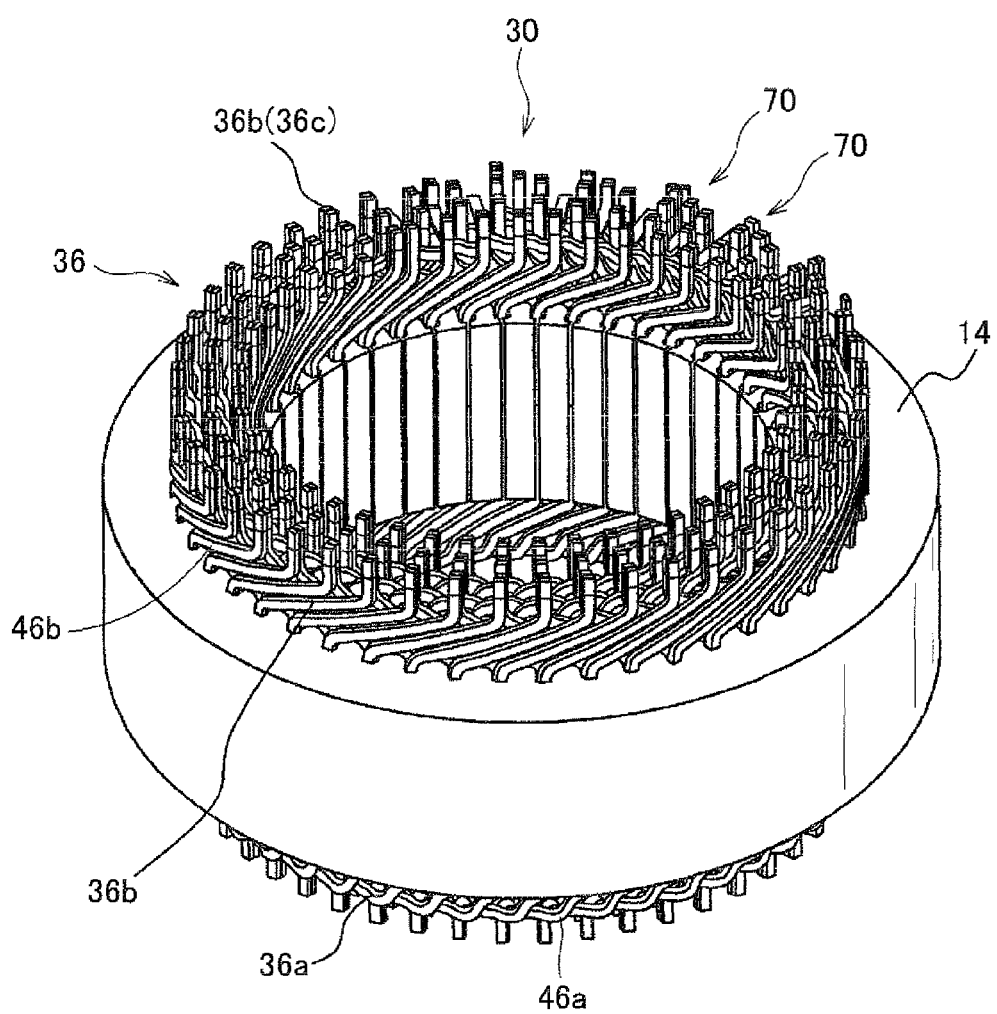
FIG. 7 is a perspective view which illustrates arrays of ends of a plurality of conductors segments disposed in an annular core of a stator of an embodiment, as viewed from a lead side where there are electric leads to which three-phase windings of an inverter are connected.
Figure 8:
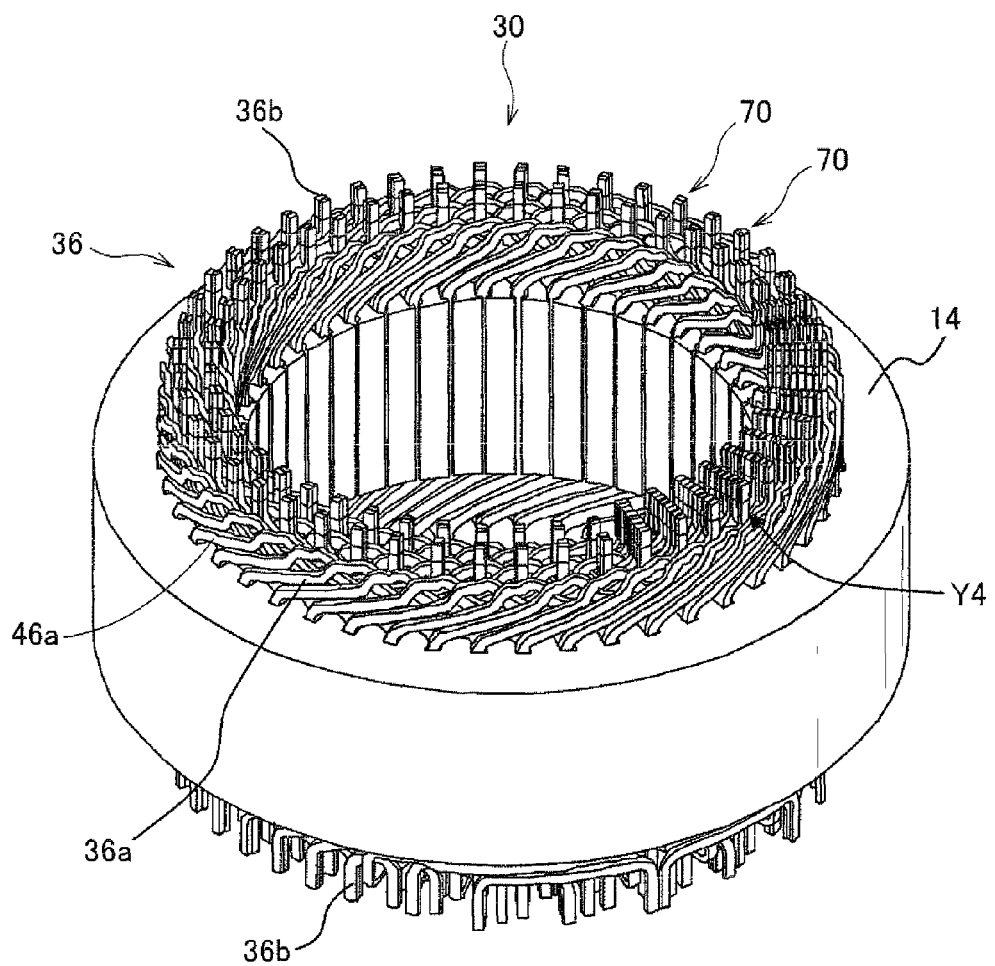
FIG. 8 is a perspective view which illustrates arrays of ends of the conductors segments disposed, as viewed from a direction opposite that in FIG. 7.

Referring to the drawings, wherein like reference numbers refer to like parts in several views, particularly to FIGS. 7 and 8, there is shown a stator 30 of an electric rotating machine such as an electric motor, an electric generator, or a motor-generator. FIG. 7 is a perspective view of the stator 30, as viewed from the side where electric leads extending from three-phase windings of an inverter (not shown) are connected to the stator 30 (which will also be referred to as a lead side below). FIG. 8 is a perspective view of the stator 30, as viewed from the opposite side of the lead side (which will also be referred to as an opposite lead side below).

Figure 2:
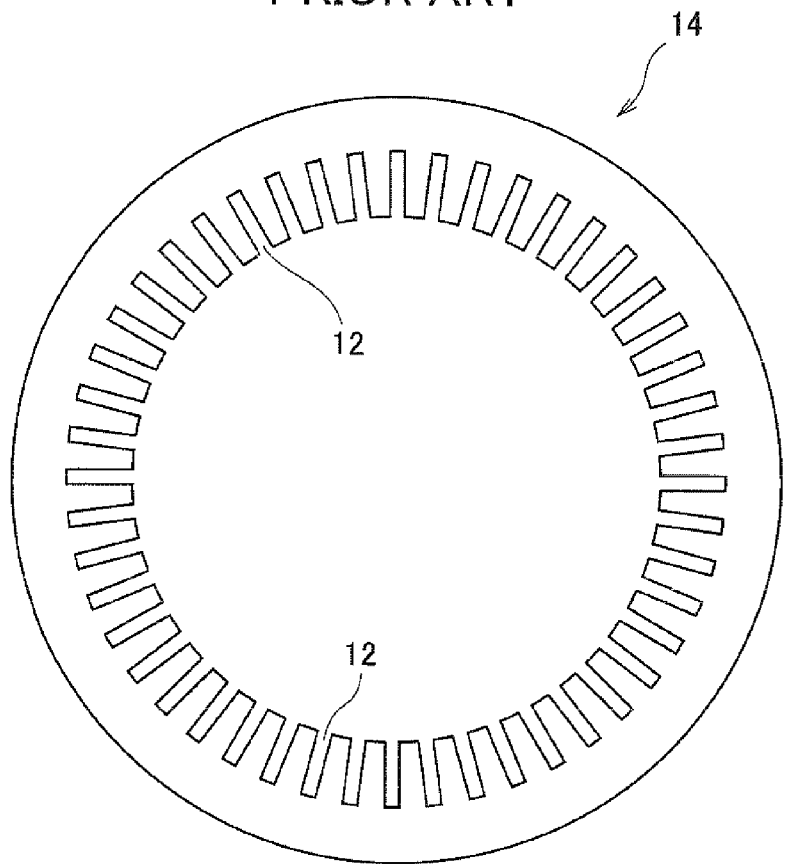
FIG. 2 is a plane view which shows an array of slots formed in the stator core of FIG. 1.
Figure 3:
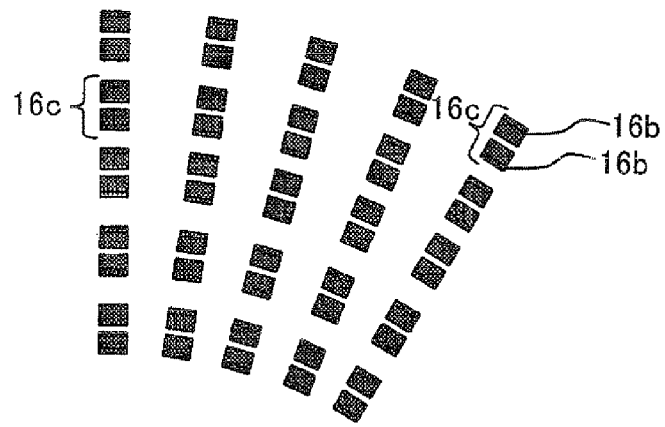
FIG. 3 is a partial view which shows an array of pairs of ends of the conductor segments of FIG. 1 to be welded together.
Figure 4:
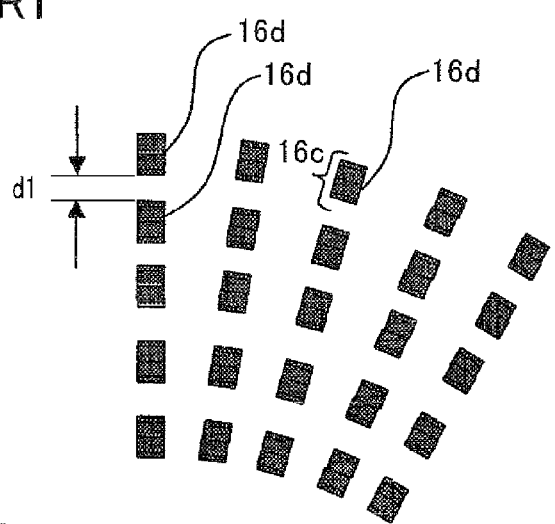
FIG. 4 is a partial view which shows an array of pairs of welded ends of the conductor segments of FIG. 1.
Figure 5:
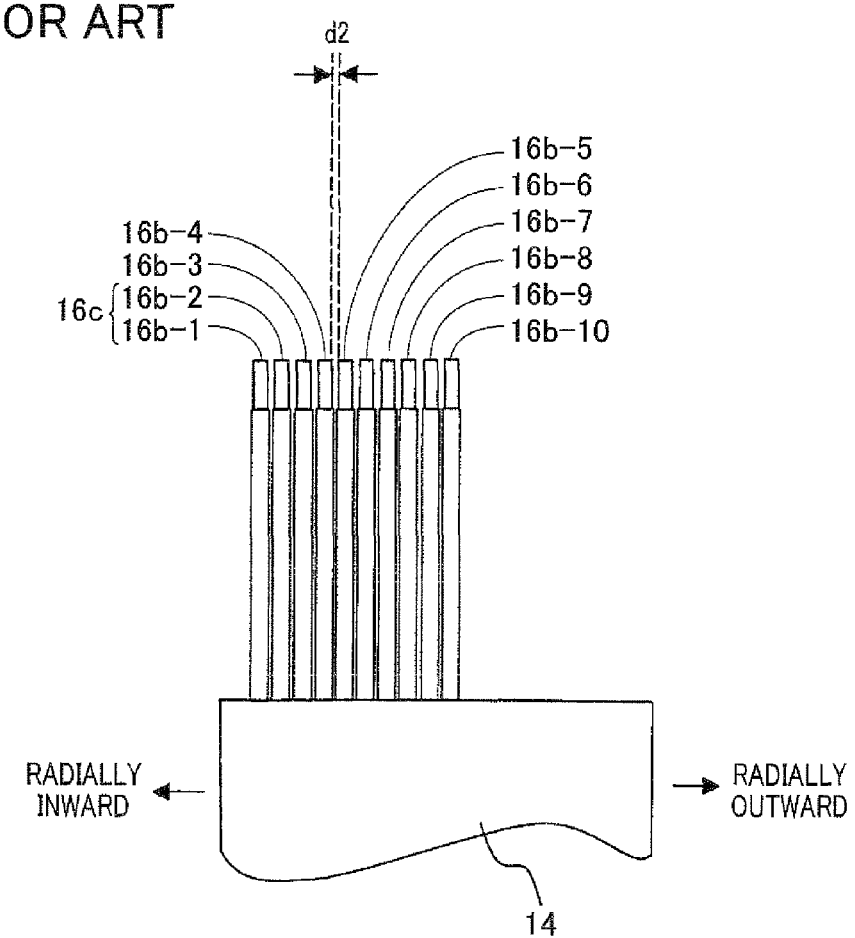
FIG. 5 is a partial side view which shows an array of the ends of the conductor segments of FIG. 1 arrayed within a slot in a radial direction of the stator core before the ends are welded.
Figure 9:
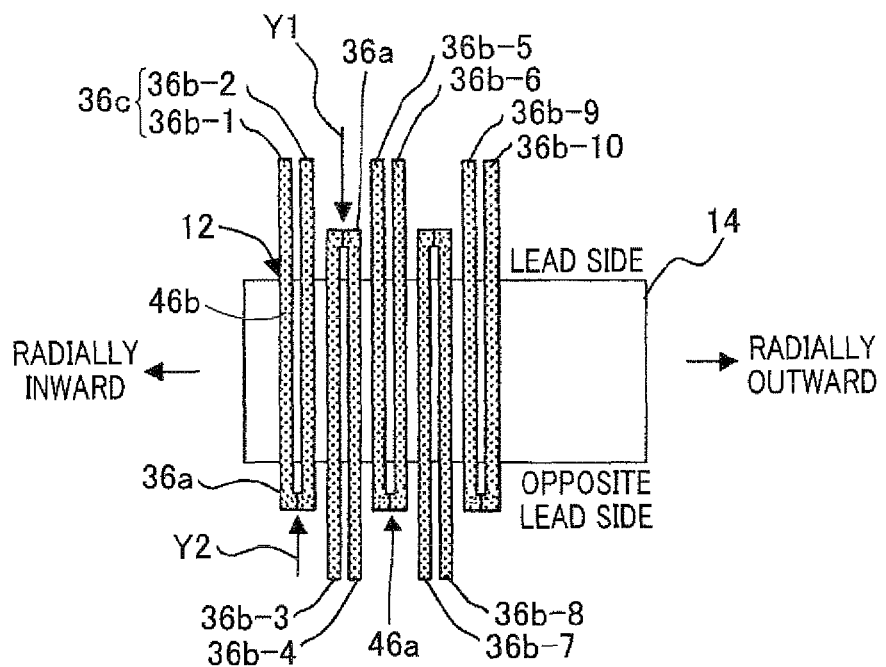
FIG. 9 is a partially cross section which shows a layout of pairs of the ends of the conductor segments of FIGS. 7 and 8 disposed in a slot of the core of the stator before the ends are welded.
Figure 10:
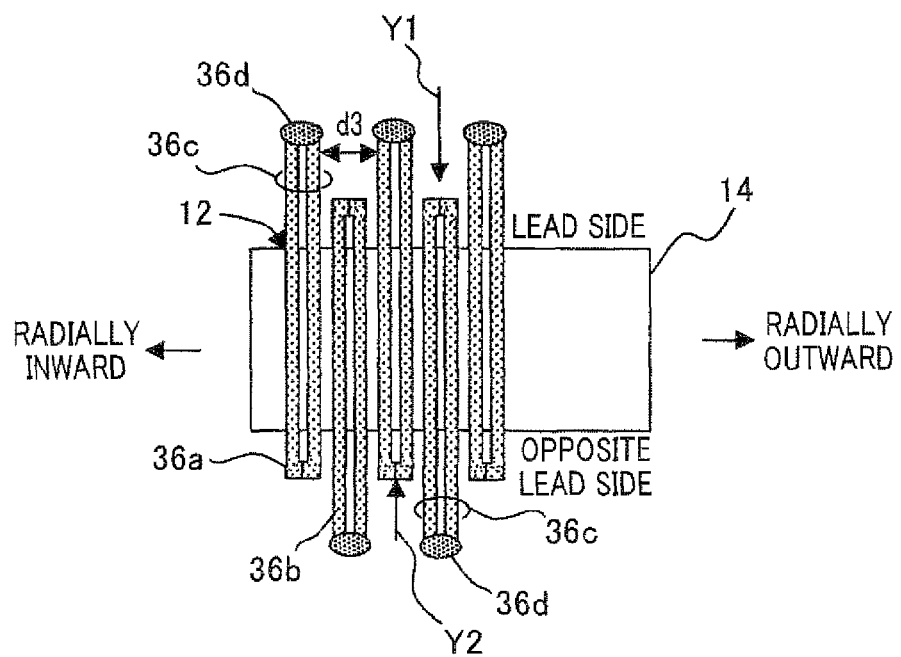
FIG. 10 is a partially cross section which shows the ends of the conductor segments, as illustrated in FIG. 9, after the ends are welded.

The stator 30 includes an annular stator core 14 and a multi-phase stator winding 36. The stator core 14 is substantially identical in structure with the one of FIG. 2 and has a plurality of slots 12 formed in an inner periphery thereof. The slots 12 are arrayed at regular intervals in a circumferential direction of the stator core 14 coaxially with the center of the stator core 14. As shown in FIGS 7-8 and 14-15, the stator winding 36 is made up of a plurality of conductor segments 36*a* which are joined sequentially. Each of the conductor segments 36*a* is bent into a U- or V-shape and includes a head 46*a*, as can be seen in FIGS. 7 and 8, and two legs 46*b*, as can be seen in FIG. 7, extending from the head 46*a*. U.S. Pat. No. 6,181,044 B1, issued on Jan. 30, 2001, assigned to the same assignee as that of this application, discloses a similar type of conductor segments, disclosure of which is incorporated herein by reference. The conductor segments 36*a* are, as illustrated in FIG. 9, inserted into the slots 12 from either of the lead side (i.e., an upper side, as viewed in the drawing) or the opposite lead side (i.e., a lower side, as viewed in the drawing) of the stator core 14, that is, from directions Y1 and Y2 opposed to each other in an axial direction of the stator core 14. Specifically, each of the legs 46*b* has a straight portion disposed within one of the slots 12 and an end 36*b* which, as clearly illustrated in FIGS. 7 and 8, extends from the straight portion outside either one of the opposed end surfaces of the stator core 14 (i.e., the lead side and the opposite lead side) and is bent in the circumferential direction of the stator core 14. The ends 36*b* of the conductor segments 36*a* are, as can be seen in FIGS. 7 and 8, arranged on either of the opposed end surfaces of the stator core 14 in a plurality of coaxial arrays. Specifically, the two ends 36*b* of each of the conductor segments 36*a*, as will be described later in detail, protrude simultaneously from one of the opposed end surfaces of the stator core 14, while the head 46*a* thereof protrudes from the other end surface of the stator core 14. In the structure of the stator 30 of this embodiment, the ten (10) legs 46*b* are arrayed in each of the slots 12. The ends 36*b* which are, as illustrated in FIGS. 9 and 10, arranged radially outward of the stator core 14 will also be referred to as first to tenth coil ends 36*b*-1 to 36*b*-10, respectively. When the stator 30 is installed in the electric rotating machine, the lead side and the opposite lead side of the stator core 14 are opposed to each other in an axial direction of a rotor (not shown) disposed inside the stator 30.

FIG. 9 is a schematic diagram which illustrates directions in which the legs 46*b* of the conductor segments 36*a* are inserted into the slots 12 of the stator core 14. In FIG. 9, the six legs 46*a* of the conductor segments 36*a* are inserted into the stator core 30 from the direction Y2, while the four legs 46*a* are inserted into the stator core 30 from the direction Y1. Consequently, the six coil ends 36*b*-1, 36*b*-2, 36*b*-5, 36*b*-6, 36*b*-9, and 36*b*-10 protrude outwardly of the lead side of the stator core 14, while the four coil ends 36*b*-3, 36*b*-4, 36*b*-7, and 36*b*-8 protrude outwardly of the opposite lead side of the stator core 14. Note that the coil ends 36*b*-1 and 36*b*-2, as can be seen from FIGS. 7 and 8 and will be apparent from the following discussion, belong to the different conductor segments 36*a*. The applies to the coil ends 36*b*-3 and 36*b*-4, the coil ends 36*b*-5 and 36*b*-6, the coil ends 36*b*-7 and 36*b*-8, and the coil ends 36*b*-9 and 36*b*-10. FIG. 9 represents only the directions Y1 and Y2 in which the legs 46*b* are to be inserted into the slots 12, but not an array of the heads 46*a* and the legs 46*a* of the conductor segments 36*a* in a radial direction of the stator core 14. In other words, FIG. 9 does not show an array in which the two heads 46*a* are interposed between adjacent two of the coil end pairs 36*c*.

After the legs 46*a* of the conductor segments 36*a* are inserted through the slots 12, each of the first to tenth coil ends 36*b*-1 to 36*b*-10 is, as illustrated in FIGS. 7 and 8, bent in either of the opposite circumferential directions of the stator core 14 and then twisted so that every two of the first to tenth coil ends 36*b*-1 to 36*b*-10 are arranged coaxially with the stator core 30. Every radially adjacent two of the coil ends 36*b* (e.g., 36*b*-1 and 36*b*-2 in FIG. 9), which will be also referred to as a coil end pair 36*c* below, are welded. Reference 36*d* indicates a weld of the coil ends 36*b* produced by, for example, TIG welding.

The coil end pairs 36*c* of the conductor segments 36*a* are, as described above, arranged above either one of the opposed end surfaces of the stator core 30 in a plurality of arrays 70, as clearly illustrated in FIGS. 7 and 8, which extend radially of the stator core 30. In FIG. 7 (i.e., the lead side), the three coil end pairs 36*c* are arranged in each of the radial arrays 70. In FIG. 8 (i.e., the opposite lead side), the two coil end pairs 36*c* are arranged in each of the radial arrays 70. As can be seen from FIGS. 7 and 8, one of the heads 46*a* is interposed between adjacent two of the coil end pairs 36*c* in each of the radial arrays 70, thereby resulting in an increase in interval d3, as illustrated in FIG. 10, between adjacent two of the coil end pairs 36*c* to ensure a required degree of electrical insulation therebetween when the coil ends 36*b* of each coil end pair 36*c* are welded. Two or more of the heads 46*a* may alternatively be interposed between every adjacent two of the coil end pairs 36*c* in each of the radial arrays 70. One of the heads 46*a* may be disposed between adjacent two of the coil end pairs 36*c*, and two of more of the heads 46*a* may be disposed between other adjacent two of the coil end pairs 36*c*.

Figure 11:
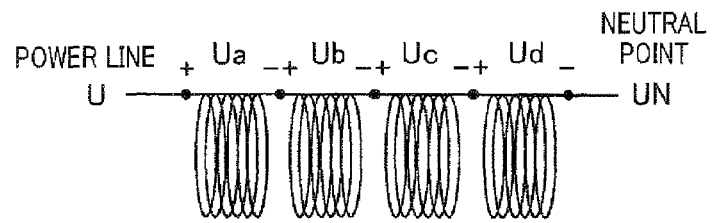
FIG. 11 is a schematic view which shows the structure of a U-phase winding passing through the core of the stator in FIGS. 7 and 8.

The winding of the conductor segments 36*a* joined at the pairs 36*c* of the coil ends 36*b*-1 to 36*b*-10 to form the stator winding 36 will be described below with reference to FIG. 11. The stator winding 36 is a three-phase winding made up of a U-phase, a V-phase, and a W-phase winding which are substantially identical in structure. FIG. 11 illustrates only the U-phase winding for the simplicity of disclosure.

Figure 12:
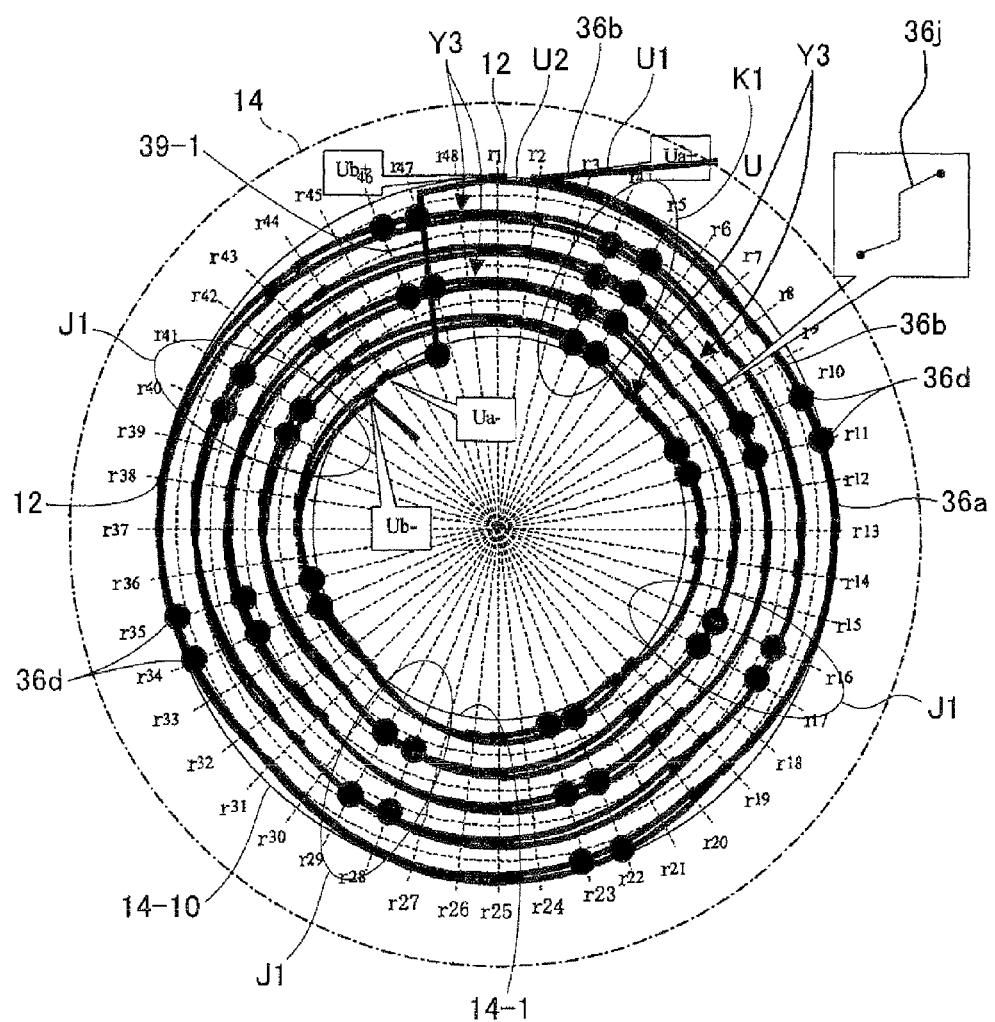
FIG. 12 is a plane view which shows the winding of a section Ua of a first winding U1 and a section Ub of a second winding U2 of FIG. 11, as viewed from a lead side of the core of the stator of FIG. 7.
Figure 13:
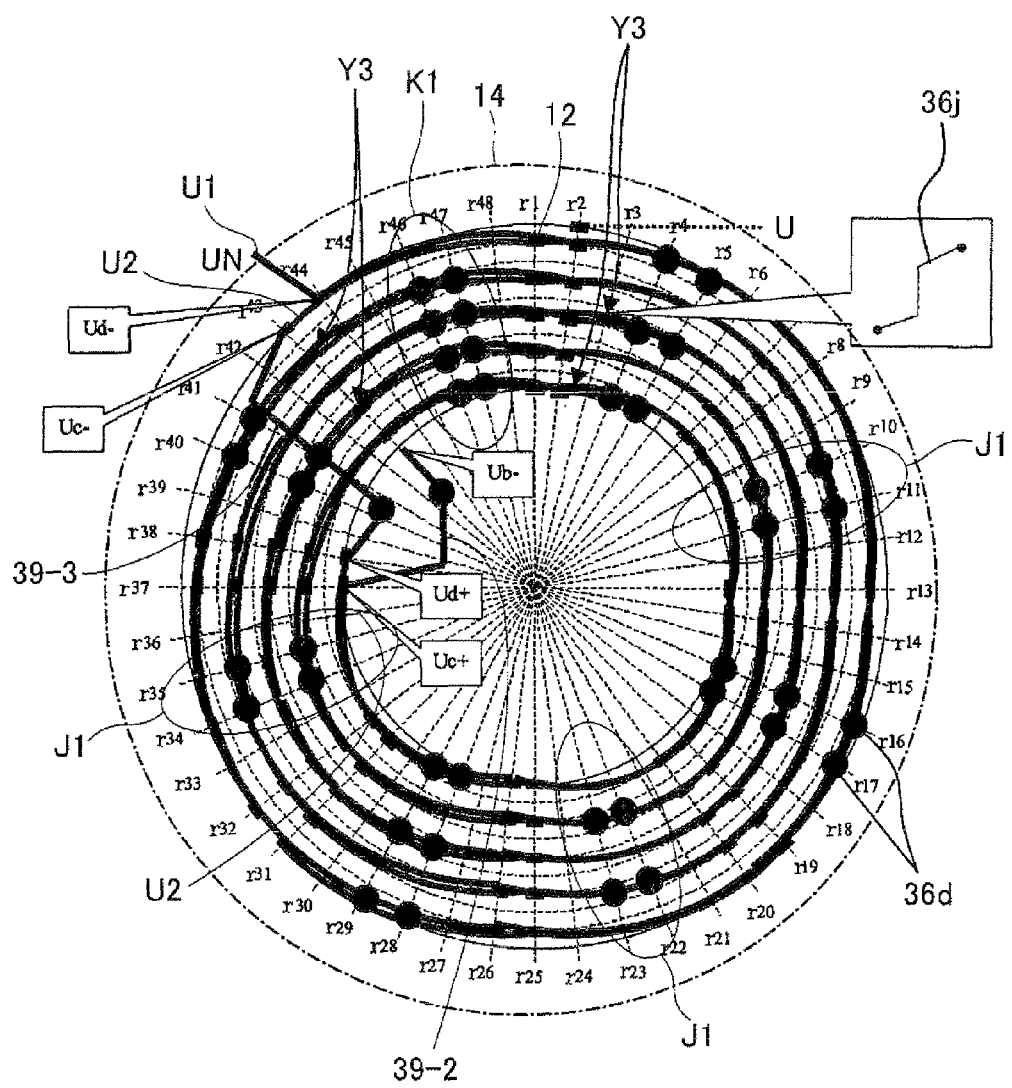
FIG. 13 is a plane view which shows the winding of a section Uc of a second winding U2 and a section Ud of a first winding U2 of FIG. 11, as viewed from the lead side of the core of the stator of FIG. 7
Figure 14:
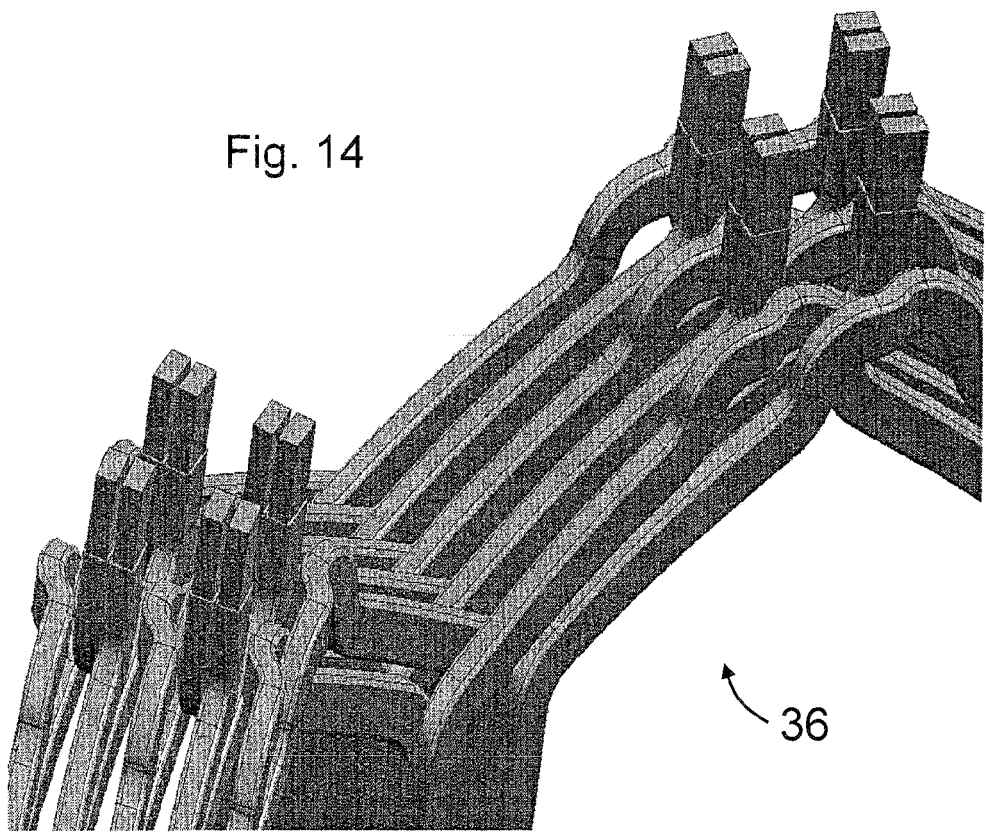
FIG. 14 is a perspective view which illustrates arrays of ends of a plurality of conductors segments of an embodiment.
Figure 15:
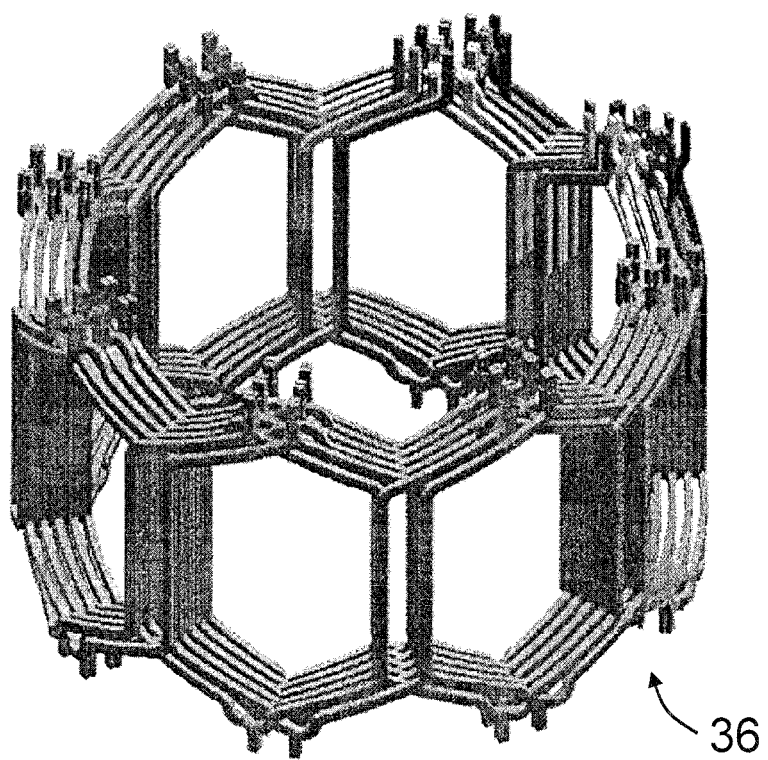
FIG. 15 is a perspective view which illustrates arrays of a plurality of conductors segments of an embodiment.

The U-phase winding is made up of coil sections Ua, Ub, Uc, and Ud extending between an end "U" thereof and a neutral point UN that is a joint to the V-phase and the W-phase windings. Each of the coil sections Ua to Ud are, as illustrated in FIGS. 12 and 13, made of the conductor segments 36*a* inserted into the slots 12 of the stator core 14. Every two of the coil ends 36*b* are, as described above, joined together through the weld 36*d*, as represented by a back circle. Note that FIGS. 12 and 13 each show the lead side of the stator core 14, and the eight black circles, as enclosed by ovals K1, sets of the four black circles, as enclosed by ovals J1, represent the welds 36*d* of the coil ends 36*b* above the opposite lead side of the stator core 14 (i.e., back sides of the drawings).

The section Ua, as illustrated in FIG. 11, extends between points "Ua+" and 2 Ua−" which will also be referred to later. Similarly, the section Ub extends between points "Ub+" and "Ub−". The section Uc is defined between points "Uc"+ and "Uc−". The section Ud extends between points "Ud+" and "Ud−".

The ten legs 46b of the conductor segments 36a are, as already described, disposed in each of the slots 12 of the stator core 14. In other words, the legs 46b of the conductor segments 36a are arranged at regular intervals in the ten coaxial circular arrays, as viewed from a direction perpendicular to the end surfaces of the stator core 14, which extend coaxially with the center of the stator core 14. Circular lines 14-1 to 14-10 in FIGS. 12 and 13 indicate the ten coaxial circular arrays of the legs 46b of the conductor segments 36a, respectively. Radial lines r1 to r48 indicates arrays of the legs of the conductor segments 36c within the slots 12 in the radial direction of the stator core 14. The legs 46b of the conductor segments 36a forming the U-phase winding are located at intersections of the ten circular lines 14-1 to 14-10 with the Nos. 1 and 2 radial lines r1 and r2, the Nos. 7 and 8 radial lines r7 and r8, Nos. 13 and 14 radial lines r13 and r14, the Nos. 19 and 20 radial lines r19 and r20, the Nos. 25 and 26 radial lines r25 and r26, the Nos. 31 and 32 radial lines r31 and r32, Nos. 37 and 38 radial lines r37 and r38, and the Nos. 43 and 44 radial lines r43 and r44.

The U-phase winding is a distributed wave winding and made up of two types: a first winding U1 and a second winding U2. The first winding U1 passes through the even-numbered slots 12: Nos. 2, 8, 14, 20, 26, 32, 38, and 44 slots 12. The second winding U2 passes through the odd-numbered slots 12: Nos. 1, 7, 13, 19, 25, 31, 37, and 43 slots 12.

The first winding U1 first enters a location, as indicated by "Ua+", that is an intersection of the tenth circular line 14-10 (i.e., an outermost one of the ten circular lines 14-1 to 14-10) with the second radial line r2 in the slot 12 from the lead side of the stator core 14, as illustrated in FIG. 12, and then exits to the opposite lead side. The location that is the intersection of the tenth circular line 14-10 with the second radial line r2 will also be referred to as an in-slot location (10-r2) below. Similarly, a location in each of the slots 12 which is expressed by an intersection of the nth circular line 14-n with the mth radial line nn will also be referred to as an in-slot location (n-rm) below.

After exiting from the in-slot location (10-r2) to the opposite lead side, the first winding U1 goes along the end surface of the stator core 14 in a clockwise direction, as viewed in the drawing, and enters the in-slot location (9-r8) which is far away from the in-slot location (10-r2) by a one pole pitch toward the lead side of the stator core 14 (i.e., the front side of the drawing). Subsequently, the first winding U1 goes along the end surface of the stator core 14 on the lead side and then enters the in-slot location (10-r14) which is far away from the in-slot location (9-r8) by a one pole pitch toward the opposite lead side of the stator core 14. In this way, the first winding U1 passes through the in-slot locations (n-rm) which are away from each other by a one-pole pitch alternately from the opposite axial directions of the stator core 14 and extends in a spiral fashion in the clockwise direction of the stator core 14. The first winding U1 exits from the in-slot location (1-r44), as expressed by "Ua−", to the lead side of the stator core 14.

The first winding U1 protruding outside the in-slot location (1-r44) on the lead side of the stator core 14 is connected electrically with the second winding U2 at the location where the first circular line 14-1 intersects with the forty-sixth radial line r46 through an electrically insulated connecting wire 39-1 extending in the radial direction of the stator core 14 over the stator winding 36. The second winding U2 then enters the in-slot location (10-r1), as indicated by "Ub+" from the lead side of the stator core 14. Like the first winding U1, the second winding U2 passes through the in-slot locations (n-rm) which are away from each other by a one-pole pitch alternately from the opposite axial directions of the stator core 14 so that it extends in a spiral fashion in the clockwise direction of the stator core 14. The second winding U2 exits from the in-slot location (1-r43), as indicated by "Ub−" in FIG. 12, to the lead side of the stator core 14.

The second winding U2 protruding outside the in-slot location (1-r43), as indicated by "Ub−" in FIG. 13, goes to the in-slot location (1-r37), as indicated by "Uc+", that is the intersection of the first circular line 14-1 with the thirty-seventh radial line r37 through a connecting wire 39-2 and then enters the in-slot location (1-r37) to the opposite lead side of the stator core 14. Subsequently, the second winding U2 passes through the in-slot locations (n-rm) which are away from each other by a one-pole pitch alternately in the same way, as described above, so that it extends in a spiral fashion in the counterclockwise direction of the stator core 14. The second winding U2 exits from the in-slot location (10-r43), as indicated by "Uc−" in FIG. 13, to the lead side of the stator core 14.

The second winding U2 protruding outside the in-slot location (10-r43) is connected electrically with the first winding U1 at the location where the first circular line 14-1 intersects with the fortieth radial line r40 through an electrically insulated connecting wire 39-3. The first wining U1 enters the in-slot location (1-r38), as indicated by "Ud+" in FIG. 13 from the lead side and exits from the opposite lead side of the stator core 14. Like the second winding U2, as described above, the first winding U1 then passes through the in-slot locations (n-rm) which are away from each other by a one-pole pitch alternately from the opposite axial directions of the stator core 14 so that it extends in a spiral fashion in the counterclockwise direction of the stator core 14. The first winding U1 finally exits from the in-slot location (10-r44), as indicated by "Ud−", to the lead side. The top end of the first winding U1 protruding from the in-slot location (10-r44) serves as the neutral point UN.

Portions of the stator winding 36, as indicated by arrows Y3 in FIGS. 12 and 13, are S-shaped conductor segments 36j. Each of the S-shaped conductor segments 36j is inserted into one of the slots 12 with ends thereof protruding outside the lead side and the opposite lead side (i.e., the opposed end surfaces) of the stator core 14, respectively, and welded at the ends thereof to the coil ends 36b of the different conductor segments 36a which protrude from the lead side and the opposite lead side of the stator core 14, respectively. In other words, each of the S-shaped conductor segments 36j connects between the ends 36b of the different conductor segments 36a which extend outside the opposed end surfaces of the stator core 14, respectively The production method of the stator 30 with the stator winding 36 wound through the stator core 14 will be described below.

The production of the first winding U1 will first be described. The legs 46b of the U-shaped conductor segment 36a are inserted from the opposite lead side (i.e., the direction Y2 in FIG. 9) into the in-slot locations (10-r2) and (9-r8) of the stator core 14 in FIG. 12, which are away from each other by a one-pole pitch on the tenth and ninth circular lines 14-10 and 14-9, so that the two ends 36b thereof protrude from the lead side of the stator core 14 (i.e., the font side of the drawing). One of these ends 36b is the end (i.e., the point "Ua+")

of the first winding U1, as illustrated in FIGS. 11 and 12, while the other is bent in the circumferential direction of the stator core 14 (i.e., the clockwise direction in FIG. 12) to be welded to the radially adjacent coil end 36*b*. Next, the legs 46*b* of the U-shaped conductor segments 36*a* are inserted from the opposite lead side into the in-slot locations (10-*r*14) and (9-*r*20) which are away from each other by a one-pole pitch on the tenth and ninth circular lines 14-10 and 14-9 and also away from the in-slot locations (10-*r*2) and (9-*r*8) by a one-pole pitch, respectively. One of the ends 36*b* of the conductor segments 36*a* protruding outside the in-slot location (10-*r*14) on the lead side is placed radially adjacent that protruding outside the in-slot location (9-*r*8) on the eleventh radial line r11 and welded together at the location, as expressed by the black circle, where the tenth circular line 14-10 intersects with the eleventh radial line r11. Similarly, the legs 46*b* of the U-shaped conductor segments 36*a* are inserted from the opposite lead side into the in-slot locations (10-*rm*) and (9-*rm*) which are away from each other by a one-pole pitch on the tenth and ninth circular lines 14-10 and 14-9 and also away from the in-slot locations (10-*r*(m-12)) and (10-*r*(m-12)) by a one-pole pitch, respectively. The ends 36*b* of the conductor segments 36*a* protruding from the lead side of the stator core 14 are welded to the radially adjacent ends 36*b*, thereby making a portion of the first winding U1 extending along the tenth and ninth circular lines 14-10 and 14-9. The portion of the first winding U1 is then welded through the S-shaped conductor segment 36*j* to another portion of the first winding U1, as described below, extending along the eighth and seventh circular lines 14-8 and 14-7.

Specifically, the legs 46*b* of the conductor segments 36*a* are inserted into the in-slot locations (7-*r*8) and (8-*r*14) on the seventh and eighth circular lines 14-7 and 14-8 from the lead side of the stator core 14 (i.e., the direction Y1 in FIG. 9), so that the ends 36*b* there protrude to the opposite lead side of the stator core 14. The end 36*b* protruding outside the in-slot location (7-*r*8) on the opposite lead side is welded to that protruding outside the in-slot location (9-*r*44) through the S-shaped conductor segment 36*j*, as indicated by Y3, at outermost ones of the black circles lying on the fortieth and fifth radial lines r47 and r5.

Subsequently, the legs 46*b* of the conductor segments 36*a* are inserted into the in-slot locations (7-*rm*) and (8-*rm*) on the seventh and eighth circular lines 14-7 and 14-8 from the lead side in the same way as the insertion of the legs 46*b* on the tenth and ninth circular lines 14-10 and 14-9, as described above. The ends 36*b* of the legs 46*b* on the seventh and eighth circular lines 14-7 and 14-8 protrude to the opposite lead side of the stator core 14. For example, the end 36*b* protruding outside the in-slot location (8-*r*14) on the opposite lead side is placed radially adjacent that protruding outside the in-slot location (7-*r*20) on the seventeenth radial line r17 and welded together at an outer one of the black circles on the seventeenth radial line r17, as enclosed by the oval J1.

Specifically, each radially adjacent two of the ends 36*b* are welded together on the opposite lead side to form the portion of the winding U1. The legs 46*b* of the conductor segments 36*a* arranged along the seventh and eighth circular lines 14-7 and 14-8 protrude in a direction opposite that in which the legs 46*b* of the conductor segments 36*a* arranged along the tenth and ninth circular lines 14-10 and 14-9 protrude. The portion of the first winding U1 extending along the seventh and eighth circular lines 14-7 and 14-8 is connected to that of the first winding U1 extending along the tenth and ninth circular lines 14-10 and 14-9 through the S-shaped conductor segment 36*j* in the same way, as described above.

Like on the ten and ninth circular lines 14-10 and 14-9, the legs 46*b* of the conductor segments 36*a* passing through the in-slot locations (6-*rm*) and (5-*rm*) on the sixth and fifth circular lines 14-6 and 14-5 are inserted from the opposite lead side of the stator core 14, so that the ends 36*b* thereof protrude to the lead side of the stator core 14. Like on the eighth and seventh circular lines 14-8 and 14-7, the legs 46*b* of the conductor segments 36*a* passing through the in-slot locations (4-*rm*) and (3-*rm*) on the fourth and third circular lines 14-4 and 14-3 are inserted from the lead side of the stator core 14, so that the ends 36*b* thereof protrude to the opposite lead side of the stator core 14. The legs 46*b* of the conductor segments 36*a* passing through the in-slot locations (2-*rm*) and (1-*rm*) on the second and first circular lines 14-2 and 14-1 are inserted from the opposite lead side of the stator core 14, so that the ends 36*b* thereof protrude to the lead side of the stator core 14. The portions of the first winding U1 extending along one of the end surfaces of the stator core 14 are, as described above, connected to that of the first winding U1 extending along the other end surface of the stator core 14 through the S-shaped conductor segments 36*j*. This completes the coil section Ua of the first winding U1, as illustrated in FIG. 11, extending between the points "Ua+" and "Ua−".

The section Ua of the first winding U1 emerges from the in-slot location (1-*r*44), as indicated by Ua−, to the lead side and then connects with the second winding U2 (i.e., the section Ub in FIG. 11) through the connecting wire 39-1 at the location where the first circular line 14-1 intersects with the forty-sixth radial line r46. The second winding U2 then enters the in-slot location (10-*r*1), as indicate by "Ub+", from the lead side and emerges to the opposite lead side of the stator core 14.

Specifically, the production of the second winding U2 (i.e., the section Ub in FIG. 11) is first achieved by inserting the legs 46*b* of the U-shaped conductor segment 36*a* from the opposite lead side into the in-slot locations (10-*r*1) and (9-*r*7) of the stator core 14 which are away from each other by a one-pole pitch on the tenth and ninth circular lines 14-10 and 14-9, so that the two ends 36*b* thereof protrude from the lead side of the stator core 14. One of these ends 36*b* is connected to the first winding U1 through the connecting wire 39-1, while the other is bent in the circumferential direction of the stator core 14 (i.e., the clockwise direction in FIG. 12) to be welded to the radially adjacent coil end 36*b* of the following conductor segment 36*b*. Similarly, the legs 46*b* of the U-shaped conductor segments 36*a* are inserted from the opposite lead side into the in-slot locations (10-*rm*) and (9-*rm*) which are away from each other by a one-pole pitch on the tenth and ninth circular lines 14-10 and 14-9 in the same way as the insertion of the legs 46*b* of the first winding U1 extending along the tenth and ninth circular lines 14-10 and 14-9, as described above. The ends 36*b* of the conductor segments 36*a* protruding from the lead side of the stator core 14 are welded to the radially adjacent ends 36*b*, thereby making a portion of the second winding U2 extending along the tenth and ninth circular lines 14-10 and 14-9. The portion of the second winding U2 is then welded through the S-shaped conductor segment 36*j* to another portion of the second winding U2 extending along the eighth and seventh circular lines 14-8 and 14-7.

Like the first winding U1, as described above, the legs 46*b* of the conductor segments 36*a* passing through the in-slot locations (6-*rm*) and (5-*rm*) on the sixth and fifth circular lines 14-6 and 14-5 are inserted from the opposite lead side of the stator core 14, so that the ends 36*b* thereof protrude to the lead side of the stator core 14. The legs 46*b* of the conductor segments 36*a* passing through the in-slot locations (4-*rm*) and (3-*rm*) on the fourth and third circular lines 14-4 and 14-3 are inserted from the lead side of the stator core 14, so that the ends 36*b* thereof protrude to the opposite lead side of the stator core 14. The legs 46*b* of the conductor segments 36*a* passing through the in-slot locations (2-*rm*) and (1-*rm*) on the second and first circular lines 14-2 and 14-1 are inserted from the opposite lead side of the stator core 14, so that the ends 36*b* thereof protrude to the lead side of the stator core 14. The portion of the second winding U2 extending along one of the end surfaces of the stator core 14 is connected to that of the second winding U2 extending along the other end surface of the stator core 14 through the S-shaped conductor segment 36*j*. This completes the section Ub of the second winding U2, as illustrated in FIG. 11, extending between the points "Ub+" and "Ub−".

The section Ub of the second winding U2 emerges from the in-slot location (1-*r*43), as indicated by "Ub−" in FIG. 13, to the lead side and then connects with the section Uc of the second winding U2 through the connecting wire 39-2 at the location where the first circular line 14-1 intersects with the thirty-seventh radial line r37. The second winding U2 (i.e., the section Uc) then enters the in-slot location (1-*r*37), as indicate by "Uc+", from the lead side and emerges to the opposite lead side of the stator core 14. The section Uc of the second winding U2 passes the slots 12 from the lead side to the opposite lead side and from the opposite lead side to the lead side alternately at an interval of a one-pole pitch in the same way as described above, extends counterclockwise in a spiral fashion, and then emerges from the in-slot location (10-*r*43), as indicated by "Uc−", to the lead side.

Specifically, the production of the section Uc of the second winding U2 is first achieved by inserting the legs 46*b* of the U-shaped conductor segment 36*a* from the opposite lead side into the in-slot locations (1-*r*37) and (2-*r*31) of the stator core 14 which are away from each other by a one-pole pitch on the first and second circular lines 14-1 and 14-2, so that the two ends 36*b* thereof protrude from the lead side of the stator core 14. One of these ends 36*b* is connected to the section Ub of the second winding U2 through the connecting wire 39-2, while the other is bent in the circumferential direction of the stator core 14 (i.e., the clockwise direction in FIG. 13) to be welded to the radially adjacent coil end 36*b* of the following conductor segment 36*a*. Similarly, the legs 46*b* of the U-shaped conductor segments 36*a* are inserted from the opposite lead side into the in-slot locations (1-*rm*) and (2-*rm*) which are away from each other by a one-pole pitch on the first and second circular lines 14-1 and 14-2. The ends 36*b* of the conductor segments 36*a* protruding from the lead side of the stator core 14 are welded to the radially adjacent ends 36*b*, thereby making a portion of the second winding U2 extending along the first and second circular lines 14-1 and 14-2. The portion of the second winding U2 is then welded through the S-shaped conductor segment 36*j* to another portion of the second winding U2 extending along the third and fourth circular lines 14-3 and 14-4, as produced by the conductor segments 36*a* inserted into the slots 12 from the lead side.

Similarly, the legs 46*b* of the conductor segments 36*a* passing through the in-slot locations (5-*rm*) and (6-*rm*) on the fifth and sixth circular lines 14-5 and 14-6 are inserted from the opposite lead side of the stator core 14, so that the ends 36*b* thereof protrude to the lead side of the stator core 14. The legs 46*b* of the conductor segments 36*a* passing through the in-slot locations (7-*rm*) and (8-*rm*) on the seventh and eighth circular lines 14-7 and 14-8 are inserted from the lead side of the stator core 14, so that the ends 36*b* thereof protrude to the opposite lead side of the stator core 14. The legs 46*b* of the conductor segments 36*a* passing through the in-slot locations (9-*rm*) and (10-*rm*) on the ninth and tenth circular lines 14-9 and 14-10 are inserted from the opposite lead side of the stator core 14, so that the ends 36*b* thereof protrude to the lead side of the stator core 14. The portion of the second winding U2 extending along one of the end surfaces of the stator core 14 is connected to that of the second winding U2 extending along the other end surface of the stator core 14 through the S-shaped conductor segment 36*j*. This completes the section Uc of the second winding U2, as illustrated in FIG. 11, extending between the points "Uc+" and "Uc−".

The section Uc of the second winding U2 emerges from the in-slot location (10-*r*43), as indicated by "Uc−" in FIG. 13, to the lead side and then connects with the section Ud of the first winding U1 through the connecting wire 39-3 at the location where the first circular line 14-1 intersects with the fortieth radial line 740. The first winding U1 (i.e., the section Ud in FIG. 11) then enters the in-slot location (1-*r*38), as indicate by "Ud+", from the lead side and emerges to the opposite lead side of the stator core 14. The section Ud of the first winding U1 passes the slots 12 from the lead side to the opposite lead side and from the opposite lead side to the lead side alternately at an interval of a one-pole pitch in the same way, as described above, extends counterclockwise in a spiral fashion, and then emerges from the in-slot location (10-*r*44), as indicated by "Ud−", to the lead side.

Specifically, the production of the section Ud of the first winding U1 is first achieved by inserting the legs 46*b* of the U-shaped conductor segment 36*a* from the opposite lead side into the in-slot locations (1-*r*38) and (2-*r*32) of the stator core 14 which are away from each other by a one-pole pitch on the first and second circular lines 14-1 and 14-2, so that the two ends 36*b* thereof protrude from the lead side of the stator core 14. One of these ends 36*b* is connected to the section Uc of the second winding U2 through the connecting wire 39-3, while the other is bent in the circumferential direction of the stator core 14 (i.e., the clockwise direction in FIG. 13) to be welded to the radially adjacent coil end 36*b* of the following conductor segment 36*a* used for forming a portion of the section Ud of the first winding U1. Similarly, the legs 46*b* of the U-shaped conductor segments 36*a* are inserted from the opposite lead side into the in-slot locations (1-*rm*) and (2-*rm*) which are away from each other by a one-pole pitch on the first and second circular lines 14-1 and 14-2. The ends 36*b* of the conductor segments 36*a* protruding to the lead side of the stator core 14 are welded to the radially adjacent ends 36*b*, thereby making a portion of the first winding U1 extending along the first and second circular lines 14-1 and 14-2. The portion of the first winding U1 is then welded through the S-shaped conductor segment 36*j* to another portion of the first winding U1 extending along the third and fourth circular lines 14-3 and 14-4.

Figure 1:
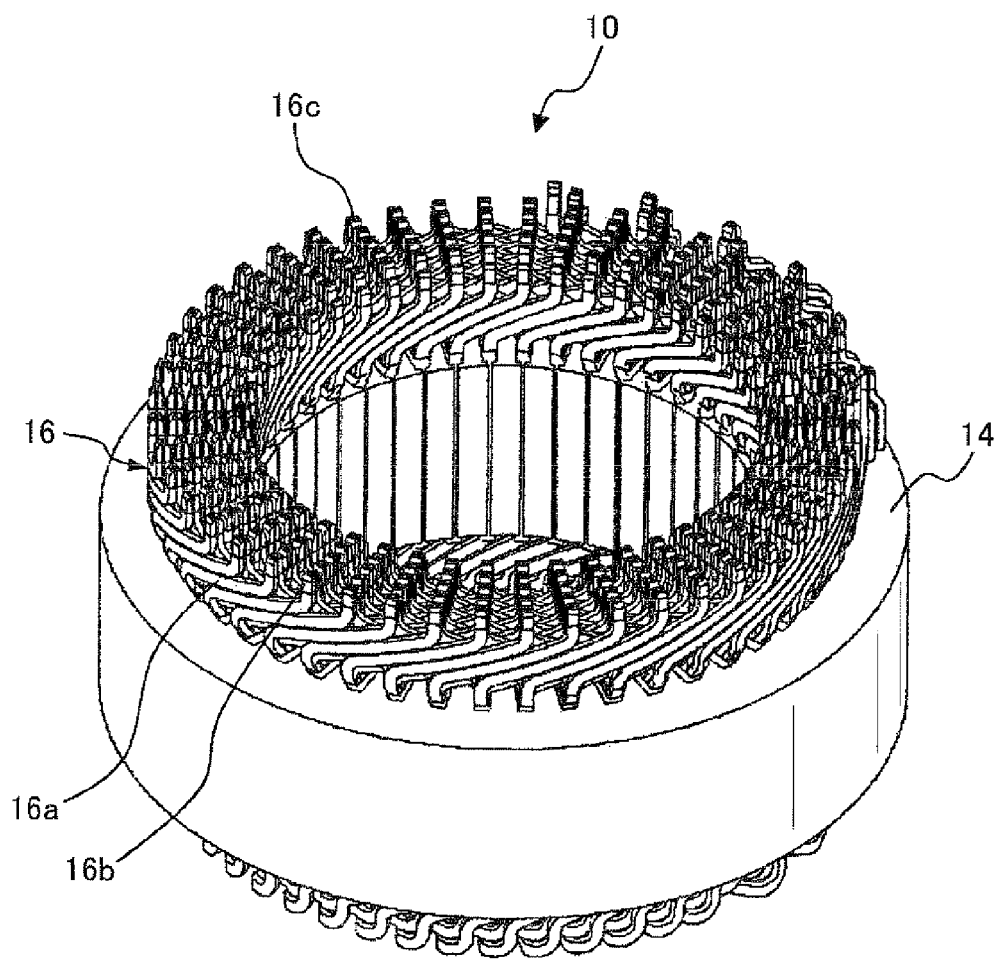
FIG. 1 is a perspective view which illustrates arrays of ends of a plurality of conductors segments disposed in an annular core of a prior art stator.

Similarly, the legs 46*b* of the conductor segments 36*a* passing through the in-slot locations (5-*rm*) and (6-*rm*) on the fifth and sixth circular lines 14-5 and 14-6 are inserted from the opposite lead side of the stator core 14, so that the ends 36*b* thereof protrude to the lead side of the stator core 14. The legs 46*b* of the conductor segments 36*a* passing through the in-slot locations (7-*rm*) and (8-*rm*) on the seventh and eighth circular lines 14-7 and 14-8 are inserted from the lead side of the stator core 14, so that the ends 36*b* thereof protrude to the opposite lead side of the stator core 14. The legs 46*b* of the conductor segments 36*a* passing through the in-slot locations (9-*rm*) and (10-*rm*) on the ninth and tenth circular lines 14-9 and 14-10 are inserted from the opposite lead side of the stator core 14, so that the ends 36*b* thereof protrude to the lead side of the stator core 14. The portion of the first winding U1 extending along one of the end surfaces of the stator core 14 is connected to that of the first winding U1 extending along the other end surface of the stator core 14 through the S-shaped conductor segment 36j. This completes the section Ud of the first winding U1, as illustrated in FIG. 1, extending between the points "Ud+" and "Ud−". The top end of the section Ud of the first winding U1 at the point "Ud−" serves as the neutral point UN.

As apparent from the above discussion, the winding of the coil sections Uc and Ud is identical with that of the coil sections Ua and Ub except for the winding direction.

The stator 30, as described above, has the stator core 14 in which the slots 12 are arrayed at regular intervals in the circumferential direction of the stator core 14 coaxially with the center of the stator core 14. Each of the slots 12 has the depth extending in the radial direction of the stator core 14. The stator winding 36 is wound through the slots 12 of the stator core 14. The stator core 36 is made up of the U-shaped conductor segments 36a joined sequentially together. Each of the U-shaped conductor segments 36a is bent to have the two legs 46b which are to be inserted simultaneously into their respective slots 12. After inserted into the slots 12, the legs 46b have the ends 36b protruding outside either of the opposed end surfaces (i.e., the lead side and the opposite lead side) of the stator core 14. The ends 36b are then bent in either of the opposite circumferential direction of the stator core 14, so that the ends 36b are arranged in the radial arrays 70. The ends 36b which extend outside the same end surface of the stator core 14 and are arranged adjacent each other in one of the radial arrays 70 (i.e., the depth-wise direction of the slot 12) are, as illustrated in FIGS. 9 and 10, paired to be welded together to form a length of the stator winding 36. Radially adjacent two of the legs 46b whose ends 36a are to be welded together and which belong to the different conductor segments 36a are inserted from either of the opposite axial directions Y1 and Y2, as illustrated in FIGS. 9 and 10. For instance, the three pairs (i.e., the coil end pairs 36c) of the ends 36b are, as demonstrated in FIGS. 9 and 10, arranged in one of the radial arrays 70 on the lead side of the stator core 14, while the two pairs of the heads 46a are arranged in the one of the radial arrays 70 on the lead side of the stator core 14, each between adjacent two of the pairs of the coil ends 36b. Two or more pairs of the head 46a may alternatively disposed between adjacent two of the pairs of the coil ends 36b.

The layout of the pairs (i.e., the coil end pairs 36c) of the ends 36b of the conductor segments 36a, as illustrated in FIGS. 9 and 10, results in an increase in interval d3, as illustrated in FIG. 10, between every two of the coil end pairs 36c in each of the radial arrays 70 on either of the opposed end surfaces of the stator core 14, thus ensuring a required degree of electrical insulation between the pairs of (i.e., the coil end pairs 36c in FIG. 9) of the coil ends 36b when being welded. This also eliminates the need for the coil ends 36b to have the length required to bend the base portions thereof, as discussed in the introductory part of this application with reference to FIG. 6, outward in the radial direction of the stator core 14, thus permitting the overall height of the coil ends 36 to be decreased. This also permits the stator 30 to be downsized in the axial direction thereof, which improves the mountability of the electric rotating machine in the automotive vehicles.

Figure 6:
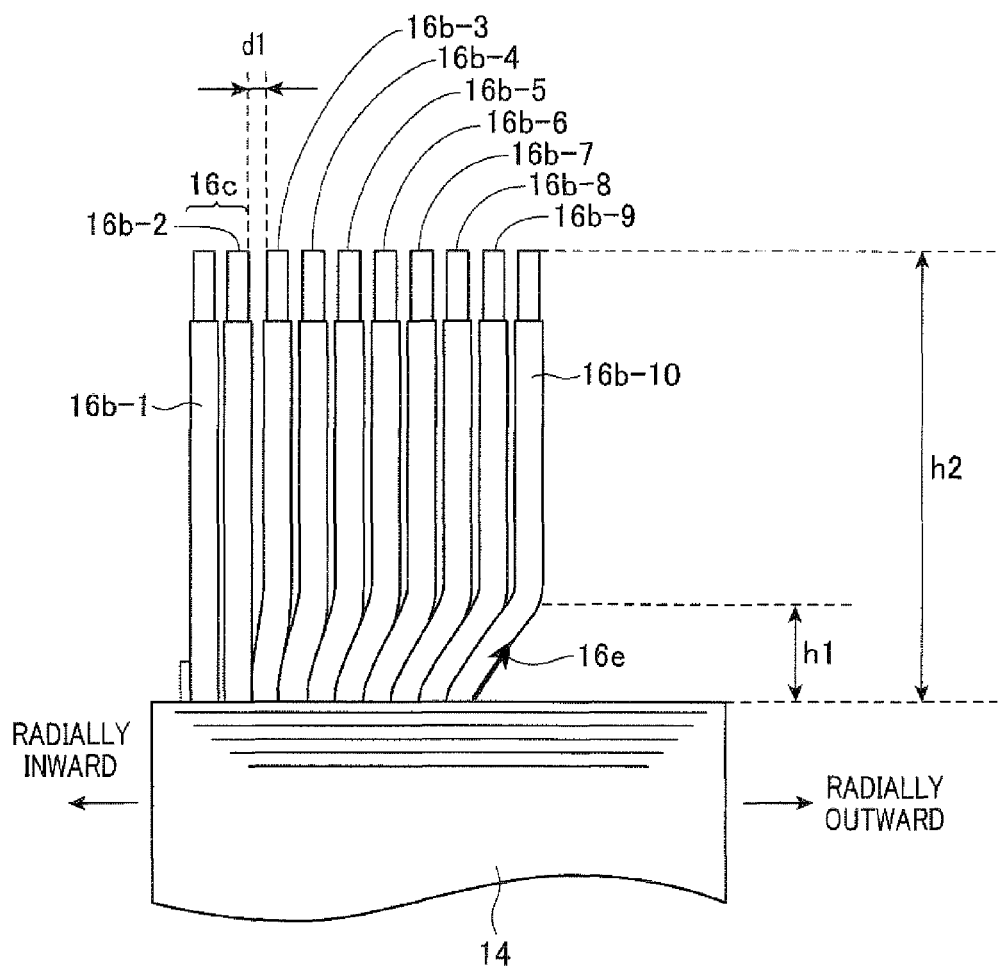
FIG. 6 is a partial side view which shows an array of the ends of the conductor segments of FIG. 1 arrayed within a slot in a radial direction of the stator core after some of the ends are bent in the radial direction.

The prior art stator, as illustrated in FIG. 6, needs to bend the coil ends 16b-3 to 16b-10 both in the circumferential direction and in the radial direction of the stator core 14, however, the stator 30 of this embodiment needs to bent the coil ends 36b only in the circumferential directions of the stator core 14, thus resulting in a decrease in deterioration of the insulating file with which the coil ends 36b are covered.

Additionally, the conductor segments 36a need not have the length required to bend the base portions of the coil ends 36b in the radial direction of the stator core 14, thus permitting the amount of material for the conductor segments 36a to be decreased, which results in a decrease in cost thereof.

Each of the U-shaped conductors 36a is, as described above, made up of the head 46a and the two legs 46b extending from ends of the head 46a. Every radially adjacent two of the pairs (i.e., the coil end pairs 36c) of the ends 36b which are to be welded are, as described above, extend from the pairs of the legs 46b inserted into the slots 12 from a same one of the axial directions Y1 and Y2. Between such two of pairs of the ends 36b, at least one of the heads 46a of the conductor segments 36a is disposed, so that every two of the coil end pairs 36c are located away from each other at an interval of at least one of the heads 46a of the conductor segments 36a above either of the opposed end surfaces of the stator core 14. This results in an increase in interval d3, as illustrated in FIG. 10, between radially adjacent two of the coil end pairs 36c, thus ensuring a required degree of electrical insulation therebetween when the ends 36b are welded.

The S-shaped conductor segment 36j is used to connect the coil end 36b protruding from one of the opposed end surfaces of the stator core 14 with that protruding from the other end surface of the stator core 14. In other words, the use of the S-shaped conductor segments achieves the connections of the ends 36a of the conductor segments 36a arrayed in the above layout.

The coil ends 36b to be connected together by the S-shaped conductor segment 36j are bent in the radial direction of the stator core 14. Specifically, the ends of the conductor segments 36a and 36j are disposed, as indicated by an arrow Y4 in FIG. 8 or enclosed by ovals K1 in FIGS. 12 and 13, close to each other in the radial direction of the stator core 14. Specifically, the ends of the conductor segments 36a and 36j are, like in FIG. 6, bent in the radial direction of the stator core, but preferably not bent at their base portions. It is advisable that radially outer some of the ends of the conductor segments 36a and 36j be bent outward at increasing angle to create an interval between the ends required to ensure a desired degree of electric insulation.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A stator for an electric rotating machine comprising:
an annular stator core which has a plurality of slots arrayed in a circumferential direction thereof, the stator core having a first end surface and a second end surface opposed to the first end surface in an axial direction thereof; and
a stator winding made up of a plurality of conductor segments, each of the conductor segments being bent to have a head and legs extending from the head, the legs of each of the conductor segments being inserted through the different slots, respectively, so that each of the conductor segments has ends of the legs thereof protruding from either one of the first and second end surfaces of the stator core and the head thereof protruding from the other of the first and second end surfaces of the stator core, wherein the ends of the legs which protrude from either of the first and second end surfaces are arranged in a plurality of radial arrays extending in a radial direction of the stator core, wherein every two of the ends of the legs which are located adjacent each other in each of the radial arrays are provided as a coil end pair, wherein adjacent two of the coil end pairs in each of the radial arrays are arranged away from each other across at least one of the heads of the conductor segments, wherein the ends of each of the coil end pairs are welded to form the stator winding;

wherein a connection is made between one of the ends of the conductor segments that protrudes from one of the first and second end surfaces of the stator core to one of the ends of the conductor segments that protrudes from the other of the first and second end surfaces of the stator core, wherein the connection is joined by ends of a second conductor segment that is different in shape from said conductor segments; and wherein the second conductor segment is an S-shaped conductor segment.

2. A stator as set forth in claim 1, wherein the stator winding is made up of the conductor segments each of which has the legs inserted into two of in-slot locations which are away from each other in the circumferential direction of the stator core, each of the in-slot locations being defined by an intersection of one of radial lines extending along the radial arrays of the ends of the conductor segments with one of a given number of coaxial circular lines extending coaxially with a center of the stator core, and wherein the legs passing through the in-slot locations on outer two of the coaxial circular lines are inserted from a first direction opposite a second direction in which the legs passing through inner two of the coaxial circular lines which extend inward of the outer two.

3. A stator as set forth in claim 1, wherein the ends of the legs of the conductor segments which are arrayed in a same one of radial arrays are bent in a radial direction of the stator core.

4. A method of producing a stator for an electric rotating machine comprising:

preparing an annular stator core which has a plurality of slots arrayed in a circumferential direction thereof, the stator core having a first end surface and a second end surface opposed to the first end surface in an axial direction thereof;

preparing a plurality of conductor segments, each of the conductor segments being bent to have a head and legs extending from the head; and inserting the legs of each of the conductor segments through the different slots, respectively, so that each of the conductor segments has ends of the legs thereof protruding from either one of the first and second end surfaces of the stator core and the head thereof protruding from the other of the first and second end surfaces of the stator core, welding the ends of the legs of the conductor segments to make a stator winding wound through the slots of the stator core, wherein the ends of the legs which protrude from either of the first and second end surfaces are arranged in a plurality of radial arrays extending radially of the stator core, wherein every two of the ends of the legs which are located adjacent each other in each of the radial arrays are provided as a coil end pair, wherein adjacent two of the coil end pairs in each of the radial arrays are arranged away from each other across at least one of the heads of the conductor segments, wherein the ends of each of the coil end pairs are welded to form the stator winding;

wherein a connection is made between one of the ends of the conductor segments that protrudes from one of the first and second end surfaces of the stator core to one of the ends of the conductor segments that protrudes from the other of the first and second end surfaces of the stator core, wherein the connection is joined by ends of a second conductor segment that is different in shape from said conductor segments; and wherein the second conductor segment is an S-shaped conductor segment.

5. A method as set forth in claim 4, wherein the stator winding is made up of the conductor segments each of which has the legs inserted into two of in-slot locations which are away from each other in the circumferential direction of the stator core, each of the in-slot locations being defined by an intersection of one of radial lines extending along the radial arrays of the ends of the conductor segments with one of a given number of coaxial circular lines extending coaxially with a center of the stator core, and wherein the legs passing through the in-slot locations on outer two of the coaxial circular lines are inserted from a first direction opposite a second direction in which the legs passing through inner two of the coaxial circular lines which extend inward of the outer two.

6. A method as set forth in claim 4, wherein the ends of the legs of the conductor segments which are arrayed in a same one of radial arrays are bent in a radial direction of the stator core.

7. A method as set forth in claim 4, wherein the S-shaped conductor segment has ends which protrude from the first and second end surfaces of the stator core, respectively.

8. A stator as set forth in claim 1, wherein the S-shaped conductor segment has ends which protrude from the first and second end surfaces of the stator core, respectively.

* * * * *